US012713140B1

(12) United States Patent
Grundhoefer

(10) Patent No.: US 12,713,140 B1
(45) Date of Patent: Aug. 18, 2026

(54) HEAD-MOUNTED ELECTRONIC DEVICE WITH LOCALIZED FLICKER DETECTION

(71) Applicant: Apple Inc., Cupertino, CA (US)

(72) Inventor: Anselm Grundhoefer, Campbell, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 18/917,119

(22) Filed: Oct. 16, 2024

Related U.S. Application Data

(60) Provisional application No. 63/605,971, filed on Dec. 4, 2023.

(51) Int. Cl.

| | |
|---|---|
| ***H04N 5/335*** | (2011.01) |
| ***H04N 23/73*** | (2023.01) |
| ***H04N 23/745*** | (2023.01) |

(52) U.S. Cl.
CPC .......... *H04N 23/745* (2023.01); *H04N 23/73* (2023.01)

(58) Field of Classification Search
CPC .................................................. H04N 23/745
See application file for complete search history.

(56) References Cited

U.S. PATENT DOCUMENTS

| | | | | |
|---|---|---|---|---|
| 11,451,718 | B1 * | 9/2022 | Nguyen | H04N 23/745 |
| 11,902,670 | B2 * | 2/2024 | Ghose | G05D 1/0094 |
| 2022/0166916 | A1 | 5/2022 | Park et al. | |
| 2022/0172486 | A1 | 6/2022 | Nakagawa et al. | |
| 2025/0111488 | A1 * | 4/2025 | McCall | G06T 5/60 |

* cited by examiner

*Primary Examiner* — Gary C Vieaux
(74) *Attorney, Agent, or Firm* — Treyz Law Group; Jason Tsai

(57) ABSTRACT

An electronic device is provided that includes external-facing cameras for acquiring images of a scene, displays configured to present the acquired images, and control circuitry configured to identify an area of the acquired images as a candidate region for including a local light source, to determine whether the candidate region exhibits a pattern indicative of flicker, and to mitigate flicker caused by the local light source on the displays by adjusting an exposure time of the external-facing cameras. The device can further include a flicker sensor for sensing one or more dominant flicker frequencies, depth sensors configured to obtain depth information from the scene, a scene understanding subsystem configured to perform semantic segmentation on the acquired images, and a motion and location determination subsystem configured to output motion and location information associated with the electronic device.

21 Claims, 6 Drawing Sheets

HEAD-MOUNTED ELECTRONIC DEVICE WITH LOCALIZED FLICKER DETECTION

This application claims the benefit of U.S. Provisional Patent Application No. 63/605,971, filed Dec. 4, 2023, which is hereby incorporated by reference herein in its entirety.

FIELD

This relates generally to electronic devices, and, more particularly, to electronic devices such as head-mounted devices.

BACKGROUND

Electronic devices such as head-mounted devices can have cameras for obtaining a live video feed of an external environment and one or more displays for presenting the live video feed to a user. The external environment can include one or more light sources. In environments with multiple light sources, each light source can have a different modulation frequency.

It can be challenging to process a live video feed of a scene with multiple light sources. If care is not taken, one or more portions of the content being displayed can exhibit flicker.

SUMMARY

An electronic device such as a head-mounted device may can be operated in a physical environment or scene. The scene can include one or more dominant flicker sources and local regions with flicker frequencies potentially different than the dominant flicker sources. An aspect of the disclosure provides a method of operating the head-mounted device that includes acquiring images of a scene with a plurality of image sensors, identifying a region of the images as a candidate region for including a light source, determining whether the candidate region exhibits a pattern indicative of flicker, and reducing image artifacts resulting from flicker caused by the light source in the candidate region by adjusting an exposure time for the plurality of image sensors. The method can further include sensing the dominant flicker frequencies in the scene. Identifying the candidate region can include identifying the candidate region based on depth information, identifying a planar surface in the scene based on the depth information, and/or performing semantic segmentation to identify a region of the images with an electronic display or a projection screen. The method can further include computing a frequency of the light source in the candidate region based on one or more of: an exposure time of the plurality of image sensors, a frame rate of the plurality of image sensors, and a line readout speed of the plurality of image sensors. The method can further include obtaining gaze data and selectively bypassing the adjustment of the exposure time for reducing flicker based on the gaze data.

An aspect of the disclosure provides a method of operating an electronic device that includes acquiring a first plurality of images with external-facing cameras and identifying a first region in the first plurality of images as a first candidate region for producing local flicker during a first time period, acquiring a second plurality of images with the external-facing cameras and identifying a second region in the second plurality of images as a second candidate region for producing local flicker during a second time period following the first time period, confirming that the second candidate region corresponds to the first candidate region, and mitigating the local flicker by adjusting an exposure time of the external-facing cameras. The method can further include determining whether the first candidate region exhibits a pattern indicative of flicker, determining whether the second candidate region exhibits a pattern indicative of flicker, computing a first frequency of the local flicker in the first candidate region, and computing a second frequency of the local flicker in the second candidate region. The method can further include identifying a first planar surface in the first candidate region, identifying a second planar surface in the second candidate region, and comparing the first planar surface to the second planar surface based on motion and location information.

An aspect of the disclosure provides a head-mounted device that includes a plurality of external-facing cameras configured to acquire images of a scene, one or more displays configured to output the acquired images, and control circuitry configured to identify an area of the acquired images as a candidate region for including a local light source, to determine whether the candidate region exhibits a pattern indicative of flicker, and to mitigate flicker caused by the local light source on the one or more displays by adjusting an exposure time of the plurality of external-facing cameras. The electronic device can include a flicker sensor configured to sense a dominant light source in the scene that may be different than the local light source in the candidate region and a flicker processor configured to obtain a frequency of the dominant light source. The electronic device can further include one or more depth sensors configured to obtain depth information from the scene, a scene understanding subsystem configured to perform semantic segmentation on the acquired images to generate corresponding labels, and a motion and location determination subsystem configured to output motion and location information associated with the electronic device. The control circuitry can be further configured to confirm whether the candidate region exhibits flicker based on the depth information, the labels, and/or the motion and location information.

DETAILED DESCRIPTION

An electronic device such as a head-mounted device may have a front face that faces away from a user's head and may have an opposing rear face that faces the user's head. One or more sensors on the front face of the device, sometimes referred to as front-facing, external-facing, or outward-facing cameras, may be used to obtain a live passthrough video stream of an external real-world environment or scene. One or more sensors on the rear face of the device, sometimes referred to as inward-facing, internal-facing, or rear-facing cameras, may be used to obtain gaze data of the user's eyes. The electronic device may include other sensors for gathering other types of user input or information associated with other parts of the user. One or more displays on the rear face of the device may be used to present the live passthrough video stream to the user's eyes.

The electronic device may include hardware and software subsystems configured to detect localized regions (areas) with flicker in the passthrough video stream being displayed to the user. In accordance with some embodiments, the subsystems can be configured to capture images, to detect regions in the captured images which are semantically classified as screens, planar surfaces, and/or other localized surfaces that might produce flicker, to check whether the pixels in these regions exhibit vertical intensity variations and/or other lighting patterns indicative of flicker, to estimate a corresponding temporal flicker frequency that would result in such flicker patterns based on known camera exposure times, frame rates, and other sensor operational parameters, to confirm the existence of such localized flicker with a sufficiently high confidence level, to compute a new camera exposure time that would minimize the perception of flicker in the local regions, and to adjust the front-facing cameras based on the newly computed exposure time. The local regions can depict objects located anywhere in the scene (e.g., the localized flicker-producing surfaces can be located relatively far from the user within the scene or can be located relatively close to the user in the scene such as when the user is standing close and in front of a large display screen). Operating an electronic device in this way can be technically advantageous and beneficial to mitigate flicker in a live passthrough video feed (e.g., to reduce image artifacts resulting from a flickering light source).

Figure 1:
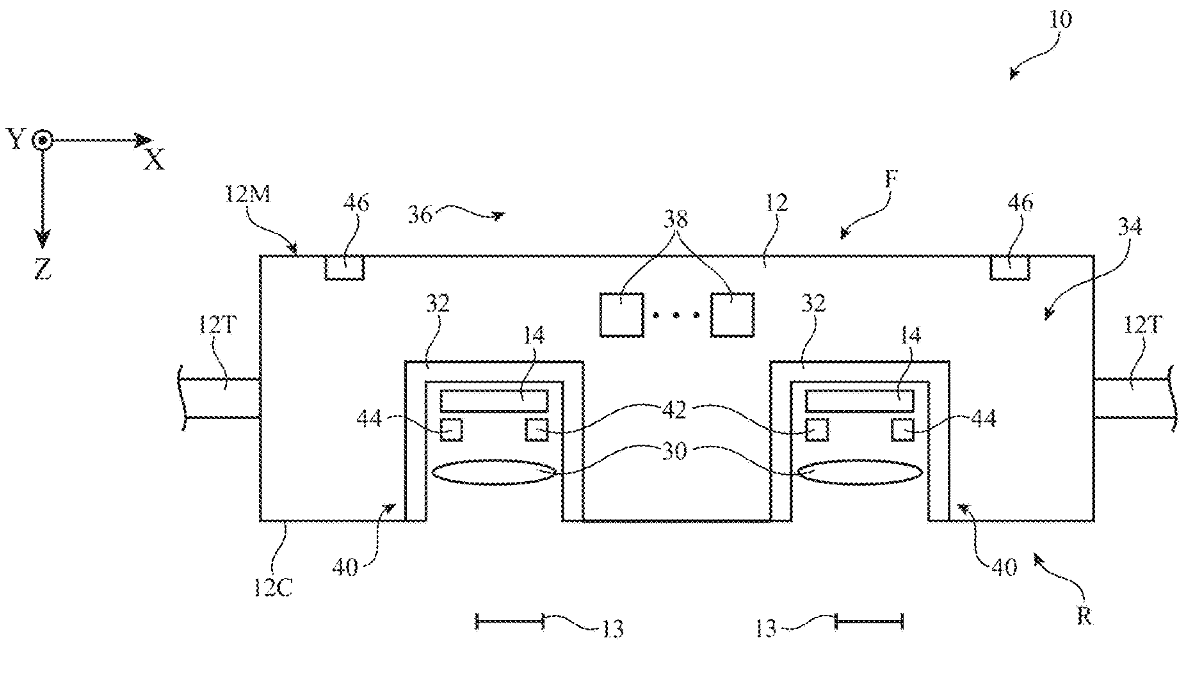
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user. Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
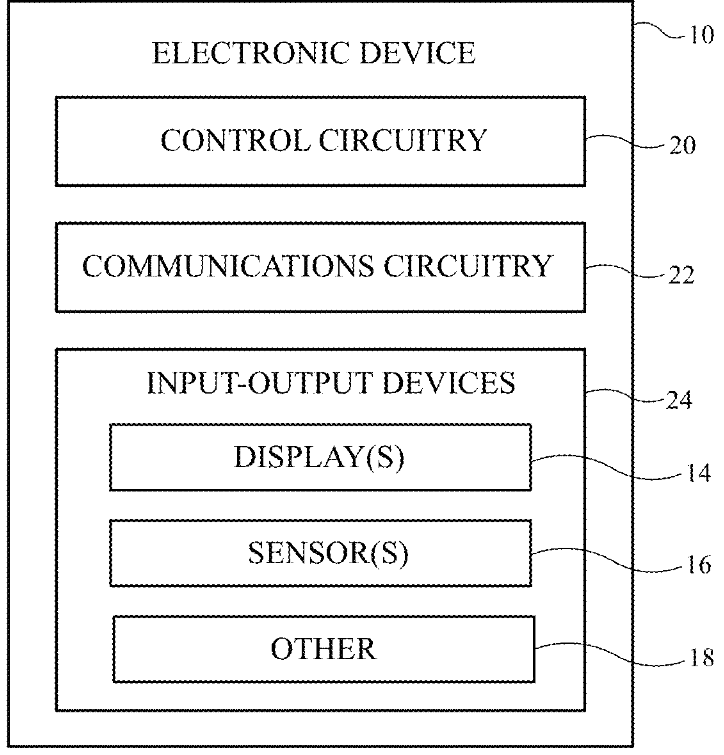
FIG. 2 is a schematic diagram of an illustrative electronic device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, real-world content can be presented by display 14. "Real-world" content may refer to images of a physical environment being captured by one or more front-facing cameras (see, e.g., cameras 46 in FIG. 1) and passed through as a live feed to the user. The real-world content being captured by the front-facing cameras is therefore sometimes referred to as a camera passthrough feed, a live video passthrough feed, or a passthrough video feed (stream).

A physical environment refers to a physical world that people can sense and/or interact with without the aid of an electronic device. A portion of the physical (3-dimensional) environment being captured by one or more cameras of device 10 is sometimes referred to as a captured scene. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. In some embodiments, display 14 can be used to output extended reality (XR) content, which can include virtual reality content, augmented reality content, and/or mixed reality content.

Figure 3:
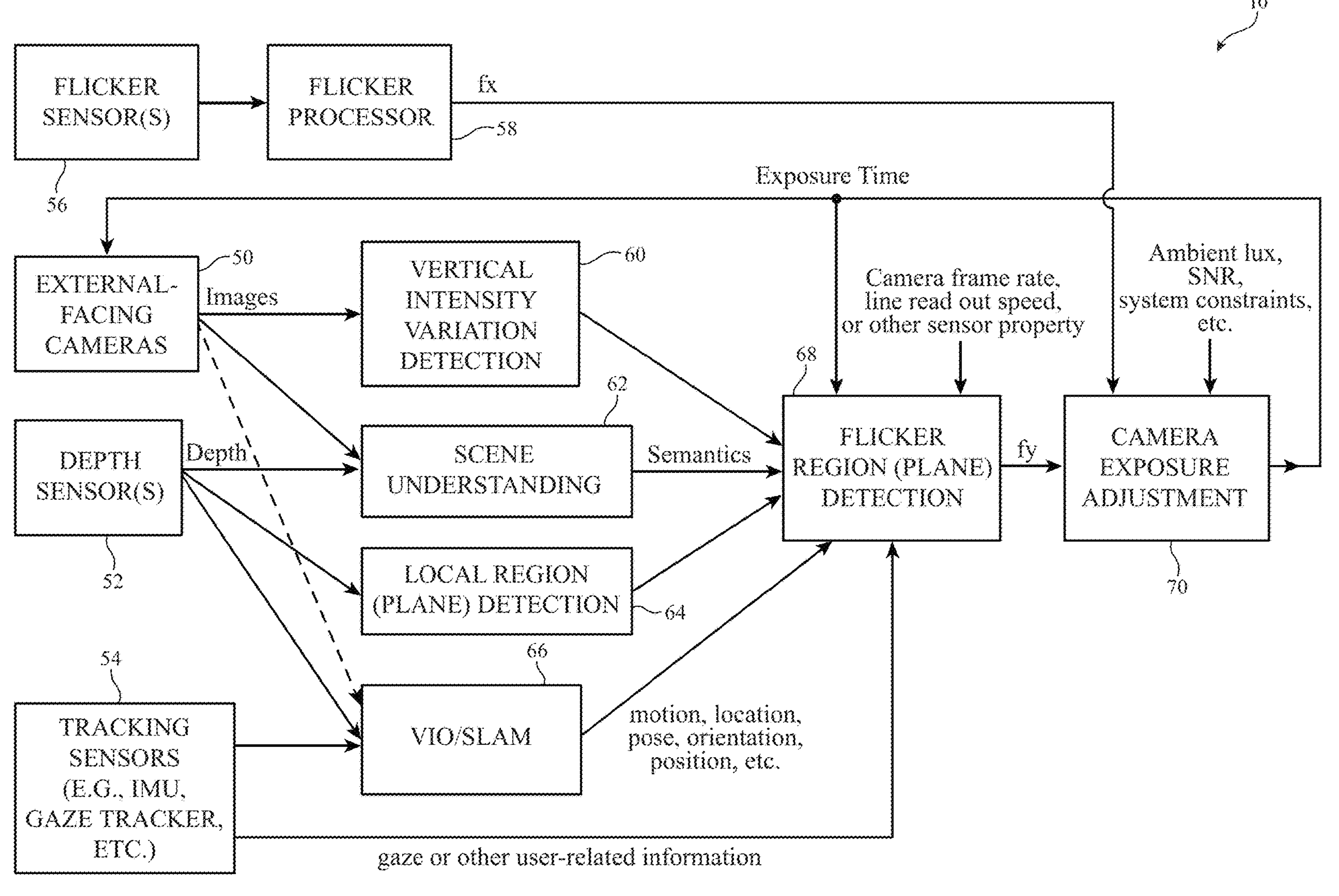
FIG. 3 is a diagram of an illustrative electronic device including components configured to perform local flicker detection and mitigation in accordance with some embodiments.

FIG. 3 is a diagram showing various hardware and/or software subsystems that can be included within electronic device 10. As shown in FIG. 3, device 10 may include one or more sensors such as flicker sensor(s) 56, scene cameras 50, depth sensor(s) 52, and tracking sensors 54, a flicker sensor data processing subsystem such as flicker processor 58, a pattern detection subsystem such as vertical intensity variation detector 60, a scene understanding subsystem such as scene understanding block 62, a local region detection subsystem such as planar surface detector 64, a motion and position determination subsystem such as visual-inertial odometry (VIO) and simultaneous localization and mapping (SLAM) block 66, a flicker region detection subsystem such as flicker region detector 68, a camera exposure adjustment subsystem such as camera exposure adjustment block 70, and/or other flicker detection/mitigation components.

Flicker sensor 56 can represent a dedicated light detector or meter configured to measure and detect variations in the intensity of light, typically caused by fluctuations in the amplitude of powered light sources in a scene. For example, light sources in the United States (US) are commonly modulated at a frequency of 60 Hz since the alternating current supplied by US power grids typically oscillate at 60 cycles per second. As another example, light sources in European countries are commonly modulated at a frequency of 50 Hz. The raw sensor data output by flicker sensor 56 can be processed using flicker processor 58. Flicker processor 58 can be configured to analyze the raw sensor data received from flicker sensor 56 and to measure/compute corresponding flicker metrics such as frequency, flicker index, phase, voltage fluctuations, and other related lighting information. The flicker frequency output from flicker processor 58 (denoted as fx in FIG. 3) may represent the frequency of the dominant light source in the physical environment or scene. A scene can include a plurality of light sources. Some of the light sources in the scene can have the same modulation frequency, and some of the light sources can have different modulation frequencies. Flicker sensor 56 senses the overall lighting of the entire scene and can detect the frequency of each of the light sources, including frequency fx of the dominant light source. The "dominant light source" can refer to or be defined as the primary or most prevalent light source in a given environment or scene (e.g., the light source with the most significant influence on the overall illumination and color perception in that scene).

One or more cameras 50 can be used to gather information on the external real-world environment surrounding device 10. Cameras 50 may include one or more of front-facing cameras 46 in FIG. 1. At least some of cameras 50 may be configured to capture a series of images of a scene, which can be presented as a live video passthrough feed to the user using displays 14. The live video passthrough feed is sometimes referred to as passthrough content. Such front-facing cameras that are employed to acquire passthrough content are sometimes referred to as scene or passthrough cameras. Cameras 50 may include color image sensors and/or optionally monochrome (black and white) image sensors. Cameras 50 can have different fields of view (e.g., some cameras can have a wide or ultrawide field of view, whereas some cameras can have relatively narrower field of view). Not of cameras 50 need to be used for capturing passthrough content. Some of the cameras 50 may be forward facing (e.g., oriented towards the scene in front of the user); some of the cameras 50 may be downward facing (e.g., oriented towards the user's torso, hands, or other parts of the user); some of the cameras 50 may be side/lateral facing (e.g., oriented towards the left and right sides of the user); and some of the cameras 50 can be oriented in other directions relative to the front face of device 10. All of these cameras 50 that are configured to gather information on the external physical environment surrounding device 10 are sometimes referred to and defined collectively as "external-facing" or "outward-facing" cameras.

One or more depth sensors 52 can be configured to measure the distance between sensors 52 and corresponding objects or surfaces within their field of view (FOV). The distance or depth information output by sensors 52 can provide information about the spatial layout of a physical environment, allowing for the creation of a 3D representation or depth map of the scene. Depth sensors 52 can compute the depth information by projecting a pattern of light onto the scene and measuring corresponding distortions in the projected pattern of light in the scene, via time-of-flight (ToF) measurement techniques, by comparing visual information from two or more scene cameras with different perspectives, and/or using other depth sensing approaches. The example of FIG. 3 in which external-facing cameras 50 and depth sensors 52 are shown as separate independent subsystems is illustrative. In some embodiments, one or more of cameras 50 can optionally be employed to obtain depth or distance information from the scene.

Tracking sensors 54 can include a gaze tracking subsystem, sometime referred to as a gaze tracker, that is configured to gather gaze information or point-of-gaze information. The gaze tracker may employ one or more inward-facing camera(s) and/or other gaze-tracking components (e.g., eye-facing components and/or other light sources that emit beams of light so that reflections of the beams from a user's eyes may be detected) to monitor the user's eyes. One or more gaze-tracking sensor(s) 54 may face a user's eyes and may track a user's gaze. A camera in a gaze-tracking subsystem may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Gaze tracking cameras may sometimes be referred to as inward-facing cameras, gaze-detection cameras, eye-tracking cameras, gaze-tracking cameras, or eye-monitoring cameras. If desired, other types of optical sensors (e.g., infrared and/or visible light-emitting diodes and light detectors, etc.) may also be used in monitoring a user's gaze.

Tracking sensors 54 can also include a face and body tracking subsystem configured to perform face tracking (e.g., to capture images of the user's jaw, mouth, etc. while the device is worn on the head of the user) and body tracking (e.g., by capturing images of the user's torso, arms, hands, legs, etc. while the device is worn on the head of user). If desired, the face and body tracking subsystem can also track a user's head pose by directly determining any movement, yaw, pitch, roll, etc. for head-mounted device 10. The yaw, roll, and pitch of the user's head may collectively define a user's head pose. For example, tracking sensors 54 can include an inertial measurement unit (IMU). The inertial measurement unit can include one or more gyroscopes, gyrocompasses, accelerometers, magnetometers, other inertial sensors, and other position and motion sensors. These position and motion sensors may assume that head-mounted device 10 is mounted on the user's head. Therefore, references herein to head pose, head movement, yaw of the user's head (e.g., rotation around a vertical axis), pitch of the user's head (e.g., rotation around a side-to-side axis), roll of the user's head (e.g., rotation around a front-to-back axis), etc. may be considered interchangeable with references to device pose, device movement, yaw of the device, pitch of the device, roll of the device, etc. In certain embodiments, tracking sensors 54 may also include 6 degrees of freedom (DoF) tracking subsystems. Six DoF tracking subsystems or sensors can be used to monitor both rotational movement such as roll, pitch, and yaw and also positional/translational movement in a 3D environment.

Tracking sensors 54 can further include a hands tracking subsystem, sometimes referred to as a hands tracker, configured to monitor a user's hand motion/gesture to obtain hand gestures data. For example, the hands tracker may include a camera and/or other gestures tracking components (e.g., outward facing components and/or light sources that emit beams of light so that reflections of the beams from a user's hand may be detected) to monitor the user's hand(s). One or more hands-tracking sensor(s) may be directed towards a user's hands and may track the motion associated with the user's hand(s), may determine whether the user is performing a tapping or swiping motion with his/her fingertips or hand(s), may determine whether the user is performing a non-contact button press or object selection operation with his/her hand(s), may determine whether the user is performing a grabbing or gripping motion with his/her hand(s), may determine whether the user is pointing at or pinching at a given object that is presented on display 14 using his/her hand(s) or fingers, may determine whether the user is performing a waving or bumping motion with his/her hand(s), or may generally measure/monitor three-dimensional non-contact gestures ("air gestures") associated with the user's hand(s). Tracking sensors 54 operable to obtain gaze, pose, hands gesture, and other information relating to a motion of a user of device 10 are sometimes referred to collectively as "user-tracking" sensors.

The example of FIG. 3 in which external-facing cameras 50 and tracking sensors 54 (e.g., optical sensors employed to obtain gaze, pose, and/or other user-related data) are shown as separate independent subsystems is illustrative. In some embodiments, one or more of external-facing cameras 50 can also be employed to obtain pose information, location information, and/or other motion/position information associated with device 10. To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

Figure 7:
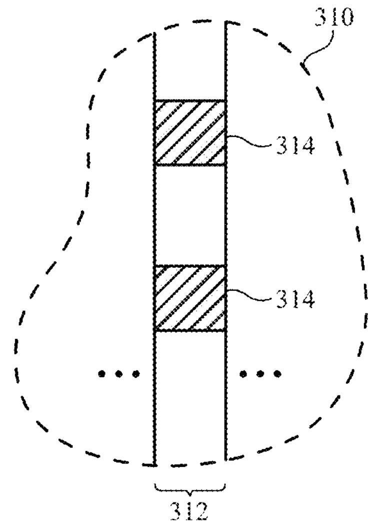
FIG. 7 is a diagram of an illustrative pattern indicative of flicker in accordance with some embodiments.

The images captured by external-facing cameras 50 can be processed by vertical intensity variation detection block 60 to determine whether any portion(s) of the capture images includes vertical intensity variations. The detection of vertical intensity variation and/or other pattern(s) indicative of flicker can be performed on local regions of images that have been identified as depicting planes, screens, displays, or other light-emitting surfaces or can optionally be performed on entire images. FIG. 7 is a diagram illustrating a vertical intensity variation. As shown in FIG. 7, a portion of an image such as portion 710 can include one or more columns of pixels, with variations in brightness intensity along the column of pixels. For example, the column of pixels can include dark pixels 314 alternating with lighter pixels. Such type of vertical intensity variation can appear as dark horizontal lines (bands) rolling through the passthrough video feed, assuming the passthrough cameras capture images in a rolling shutter fashion. Although vertical intensity variation detection block 60 is shown as a separate component from flicker processor 58, detector 60 can sometimes be implemented as part of flicker processor 58. In other embodiments where the passthrough cameras are configured to capture images in a global shutter fashion, the captured images might also produce banding or other image artifacts that can arise in the presence of a flicker-causing light source. This example in which block 60 is configured to detect vertical intensity variation in any portion of a captured image is illustrative. In general, block 60 can be configured to detect vertical intensity variation (e.g., to detect the presence of horizontal bands or stripes running across an image), horizontal intensity variation (e.g., to detect the presence of vertical bands or stripes running across an image), a checkboard pattern (e.g., to detect a grid of alternating light and dark rectangles), moiré patterns (e.g., to detect wavy or other interference patterns), undesired brightness or color shifts/banding, ghosting or double images, flickering edges, jagged or uneven lines, image artifacts associated with global shutter image sensors in the presence of flicker, and/or other patterns or visual artifacts indicative of flicker.

Referring back to FIG. 3, scene understanding block 62 can receive the images from external-facing cameras 50 and the depth/distance information from depth sensor(s) 52. Scene understanding block 62 can be a software and/or hardware component configured to interpret and comprehend the received content. Scene understanding block 62 can be a machine learning based component such as a neural network that has been trained on a large database of real-world or synthesized images. As an example, scene understanding block 62 can be configured to perform semantic segmentation (e.g., to divide an image into distinct regions or segments, where each segment corresponds to a particular object or class of objects) on one or more of the camera images. Semantic segmentation can be used to distinguish between walls, floors, ceilings, table or countertops, display panels, projection screens, touch screens, and/or other planar or curved surfaces. Semantic segmentation can, via feature extraction techniques, assign a label to every pixel in an image to provide a detailed understanding of the scene.

As other examples, scene understanding block 62 can be configured to detect and track various types of objects in an image (e.g., to identify and track objects in the real-world environment such as to recognize specific objects, surfaces, or even people), to detect surfaces (e.g., to determine the characteristic and layout of surfaces such as walls, tables, display panels, and other surfaces), to detect the location of the user and objects in an image within the user's environment (e.g., to estimate the distance of objects or to obtain depth information), to detect whether a moving object is a dog, etc.), and/or to maintain a representation of the user's environment over time. Extracting meaningful information from the surrounding environment using scene understanding block 62 can allow device 10 to accurately overlay (display) virtual objects on top of the real-world objects in a contextually relevant manner.

Local region detector 64 can receive the depth/distance information from depth sensor(s) 52. Local region detector 64 can be a software and/or hardware component configured to detect certain types of surfaces in the scene based on the received depth information. For example, local region detector 64 can be configured to detect one or more planar surfaces in the scene. Detector 64 is there sometimes referred to as a planar surface detection block or a plane estimation block. This is illustrative. In other embodiments, local region detector 64 can be configured to detect curved surfaces, surfaces of lamp shades, surfaces of light bulbs or other light sources, and/or other surfaces or regions of the scene that are likely to produce flicker. Although local region detector 64 is illustrated as a separate component from block 62, local region detector 64 can sometimes be considered to be part of scene understanding block 62. For instance, the designation or detection of an object or surface as being a "plane" can be one of various semantic labels being applied to an image by the scene understanding algorithm.

Block 66 can be configured to receive depth/distance information from depth sensor(s) 52, measurement data from tracking sensors 54 (e.g., position and motion data from the inertial measurement unit), and optionally images from one or more external-facing cameras 50. Block 66 can include a visual-inertial odometry (VIO) subsystem that combines the visual information from cameras 50, the data from the inertial measurement unit, and optionally the depth information from sensor(s) 52 to estimate the motion of device 10. Additionally or alternatively, block 66 can include a simultaneous localization and mapping (SLAM) subsystem that combines the visual information from cameras 50, the data from the inertial measurement unit, and the depth information from sensor(s) 52 to construct a 2D or 3D map of a physical environment while simultaneously tracking the location and/or orientation of device 10 within that environment. Configured in this way, block 66 (sometimes referred to as a VIO/SLAM block or a motion and location determination subsystem) can be configured to output motion information, location information, pose/orientation information, and other position-related information associated with device 10 within a physical environment.

Flicker region detection block 68 can receive information from a variety of signal sources. In the example of FIG. 3, block 68 can receive a signal from block 60 (e.g., a signal indicating whether one or more portions of a captured image exhibits vertical intensity variation or other patterns indicative of flicker), a signal from scene understanding block 62 (e.g., a signal identifying segments of the captured image semantically classified as a display screen, a projection screen, or other flicker surfaces), a signal from local region detection block 64 (e.g., a signal identifying planar surfaces in the captured image or other types of surfaces that might produce flicker), a signal from VIO/SLAM block 66 (e.g., a signal relating to the motion, location, pose, orientation, and/or other position-related information associated with device 10), gaze or other user-related information directly from tracking sensors 54, and information relating to the capture of the scene images (e.g., an exposure time, frame rate, line readout speed, or other properties related to the operation of cameras 50). Vertical intensity variation can occur when the external-facing cameras 50 are implemented as rolling shutter cameras. Rolling shutter cameras can refer to or be defined herein as image sensors that capture images by sequentially exposing different rows of pixels, thus resulting in a scanning effect in certain situations.

Based on at least some of the received information, flicker region detection region block 68 can determine whether one or more portions of the captured images produce localized flicker with a frequency fy. Unlike frequency fx, which represents the modulation frequency of the dominant light source in the overall scene, frequency fy represents the modulation frequency of a light source in a local or localized region of the scene. Such light source in a localized region of the image can be referred to as a "local light source." Such local light source actively emits light in that region of the image, as opposed to being merely illuminated by some other light source from another portion of the scene. Frequency fx is therefore sometimes referred to as "dominant" light frequency, whereas frequency fy can be referred to as "local" or "localized" light frequency. Any flicker resulting from the local light source can be referred to as "local flicker" (as opposed to the overall scene flicker that might result from the dominant light source in the scene). For example, fy may represent the frequency of light emitted from a smart phone occupying a relatively small portion of the overall image, the frequency of light emitted from a television screen occupying a portion of the overall image, the frequency of light emitted from a lamp occupying a portion of the overall image, or the frequency of other light source(s) within the scene. Flicker region detection block 68 can output one or more local light frequencies if there are multiple local regions in the scene that might separately produce flicker.

Either the dominant light source or one or more local light sources within the scene can produce flicker. Camera exposure adjustment block 70 may receive dominant light frequency fx, local light frequency fy, an ambient brightness level (e.g., a lux reading from an ambient light sensor within device 10), a signal-to-noise ratio (SNR), and/or other system constraints to compute an optimized new exposure time for one or more cameras 50 to minimize the perception of flicker in the passthrough content being displayed to the user while simultaneously optimizing for reduced motion blur, reduce noise, and improved visual comfort.

Any of the subsystems or blocks shown in FIG. 3 that are not implemented as a separate dedicated hardware component can be considered part of control circuitry 20 of FIG. 2. For instance, one or more software subsystems employed to carry out the functions of the various blocks in FIG. 3 can be executed on one or more processors within control circuitry 20.

Figure 4:
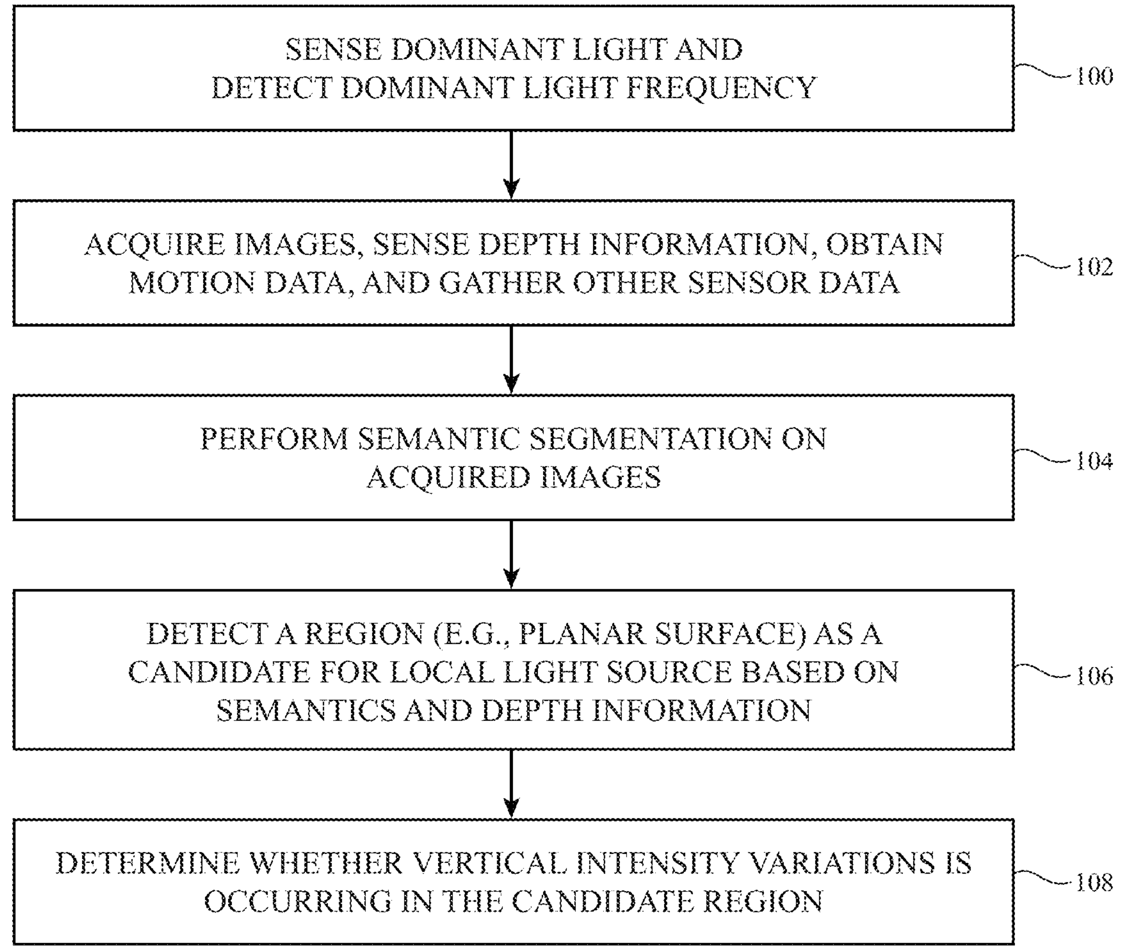
FIGS. 4 and 5 are flow charts showing illustrative steps for operating an electronic device of the type shown in FIG. 3 in accordance with some embodiments.

FIG. 4 is a flow chart of illustrative steps for operating electronic device 10 of the type described in connection with FIGS. 1-3. During the operations of step 100, one or more flicker sensor(s) 56 may be configured to sense a dominant light (or dominate light source) in a scene. Flicker processor 58 or other optical signal processing unit can be configured to detect a corresponding frequency of the dominant light source (see, e.g., dominant light source frequency fx in FIG. 3). The scene can include one or more dominant light sources. In general, flicker sensor(s) 56 can be used to sense one or more dominant flicker frequencies in the scene.

During the operations of step 102, one or more sensors in device 10 can be configured to acquire images, sense depth information, obtain motion data, and gather other sensor measurement data. For example, one or more external-facing cameras 50 can be used to capture images of the scene; one or more depth sensor(s) 52 can be used to obtain depth and/or distance information from the scene; and tracking sensors 54 can be used to gather data relating to the user and data relating to the motion and position of device 10.

During the operations of step 104, scene understanding block 62 may be configured to perform semantic segmentation on the images acquired by cameras 50. For example, the semantic segmentation operations can include segregating an image into distinct regions or segments, where each segment corresponds to a particular object or class of objects. Semantic segmentation can be used to distinguish between walls, floors, ceilings, table or countertops, display panels, projection screens, touch screens, and/or other planar or curved surfaces. Semantic segmentation can, via feature extraction techniques, assign a label to every pixel in the acquired image to provide a detailed understanding of the scene.

Figure 6:
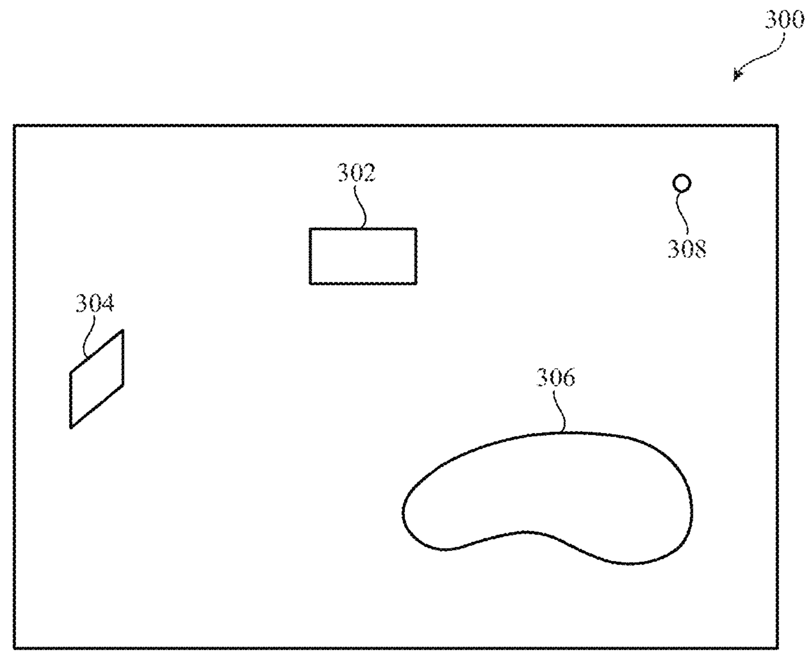
FIG. 6 is a diagram of an illustrative image having portions representing flicker candidate regions in accordance with some embodiments.

During the operations of step 106, a region can be detected as a candidate for having a local light source based on the semantics/labels output from the scene understanding block 62 and/or optionally based on the depth/distance information output from the depth sensor(s) 52. Such candidate region that might include a local light source can sometimes be referred to herein as a "flicker candidate region." The local light source can exhibit a flicker frequency that is different than the dominant flicker frequencies in the scene. As an example, local region detector 64 can be configured to detect one or more planar surfaces in the scene. As other examples, local region detector 64 can be configured to detect curved surfaces, surfaces of lamp shades, surfaces of light bulbs or other light sources, and/or other surfaces or candidate regions of the scene that are likely to produce flicker. FIG. 6 is a diagram of an illustrative image 300 having portions representing flicker candidate regions in accordance with some embodiments. As shown in FIG. 6, a first planar surface 302, a second planar surface 304, a non-planar surface 306, and a circular region 308 can all be identified as potential flicker candidate regions. In general, regions having other surfaces or shapes can be identified as flicker candidate regions during step 106.

The candidate region as identified by scene understanding block 62 should be aligned with the candidate region as identified by the local region detector 64. If not, then additional measurements may be required to ensure that the two flicker candidate regions are sufficiently aligned. Having two separate blocks 62 and 64 for confirming flicker candidate regions in parallel can help provide redundancy while improving sensing accuracy. If desired, either block 62 or block 64 can be bypassed or omitted to help streamline this process. Although the operations of step 106 is shown as occurring after the operations of block 104, the operations of block 102 can occur in parallel (simultaneously) with or before the operations of block 100.

During the operations of step 108, flicker region detection block 68 may determine whether the candidate region identified from step 106 exhibits vertical intensity variation or other pattern indicative of flicker. If so, then block 68 has successfully confirmed that the localized/candidate region produces flicker (e.g., that the candidate region corresponds to a surface having a localized light source with flicker artifacts). The example of step 108 for detecting vertical intensity variation is illustrative. In other embodiments, step 108 can involve determining whether the candidate region exhibits horizontal intensity variation (e.g., to detect the presence of vertical bands or stripes running across an image), a checkboard pattern (e.g., to detect a grid of alternating light and dark rectangles), moiré patterns (e.g., to detect wavy or other interference patterns), undesired brightness or color shifts/banding, ghosting or double images, flickering edges, jagged or uneven lines, and/or other patterns or visual artifacts indicative of flicker.

Although the operations of steps 102-108 are shown as occurring after the operations of step 100, any of the operations of steps 102-108 can occur in parallel (simultaneously) with or before the operations of step 100.

Figure 5:
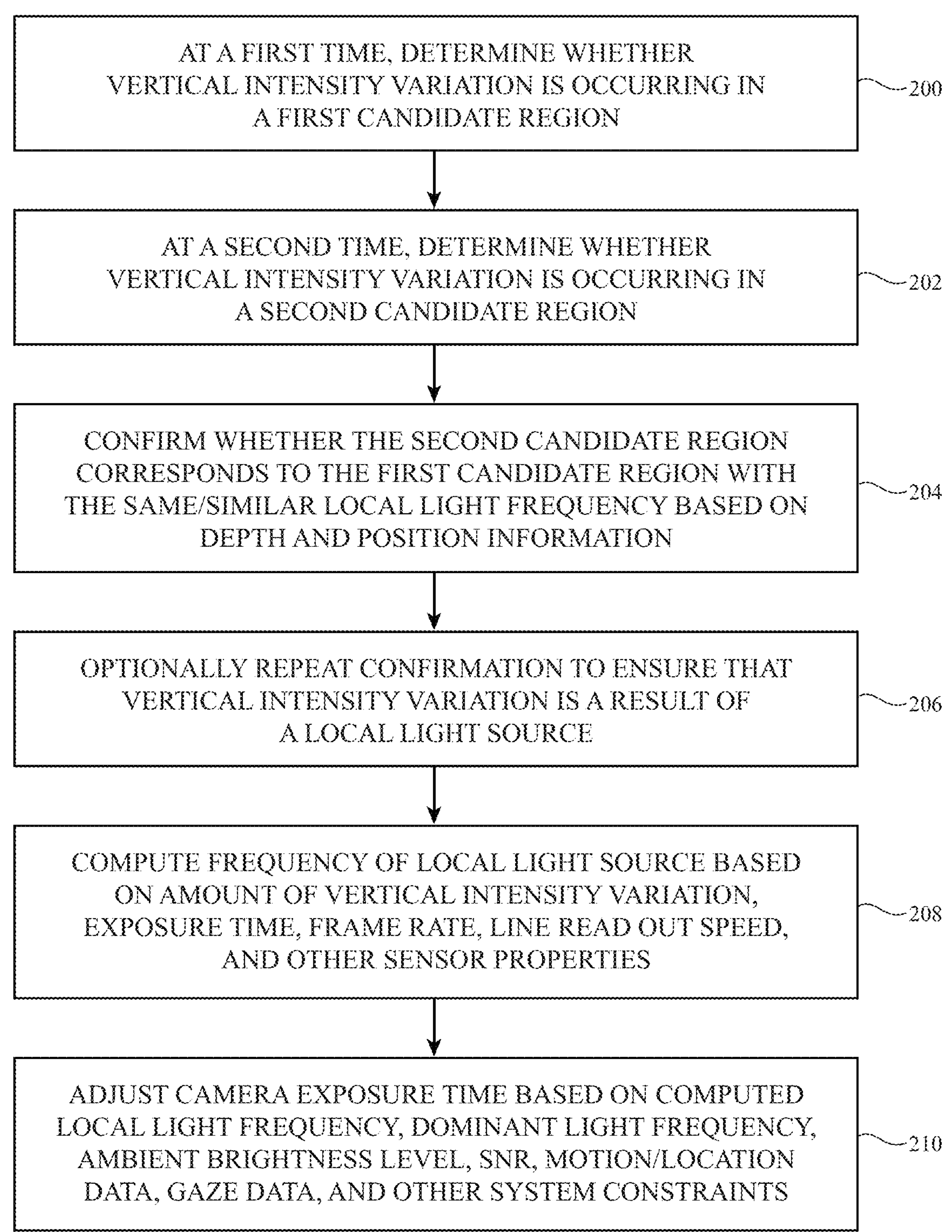

FIG. 5 is a flow chart showing additional steps for operating electronic device 10 of the type described in connection with FIGS. 1-4. During the operations of step 200 (e.g., at a first time or during a first time period), device 10 may determine whether at least a first candidate region in the captured image exhibits vertical intensity variation or other patterns indicative of flicker. The operations of step 200 can include performing steps 100-108 described above in connection with FIG. 4.

During the operations of step 202 (e.g., at a second time after the first time or during a second time period following the first time period), device 10 may determine whether at least a second candidate region in a newly captured image exhibits vertical intensity variation or other patterns indicate of flicker. The operations of step 202 can include reiterating steps 100-108 described above in connection with FIG. 5.

During the operations of step 204, device 10 can confirm whether the second candidate region corresponds to the first candidate region with the same or similar local light frequency based on the depth information output from depth sensor(s) 52 and/or based on the motion, location, pose, orientation, and position information output from VIO/SLAM block 66. Step 204 validates whether the first candidate region includes the same flicker-producing surface or object as the second candidate region even if the location, position, or orientation of device 10 has changed between the first time period and the second time period. For example, device 10 may compare a first planar surface in the first candidate region to a second planar surface in the second candidate region based on the motion/location information to ensure that the two candidate regions are associated with the same flicker-producing surface or object.

During the operations of step 206, device 10 can optionally repeat the validation operations of block 204 to ensure that the vertical intensity variation or other pattern indicative of flicker in the candidate region(s) is indeed a result of a local flickering light source but not the result of a variation in reflectance coincidentally aligned with a column of pixels. This confirmation process can be repeated a number of times until a sufficiently high confidence level is reached.

During the operations of step 208, device 10 can compute a corresponding frequency fy of the local light source in the candidate region based on the amount of vertical intensity variation (or a degree of variation of other patterns indicative of flicker), an exposure time of one or more cameras 50, a frame rate of one or more cameras 50, a line readout speed of one or more cameras 50, and/or other sensor properties associated with one or more cameras 50.

During the operations of step 210, device 10 can adjust the exposure time for one or more cameras 50 based on the computed frequency fy, the detected dominant light frequency fx (e.g., the frequency of a dominant light source as detected during step 100 of FIG. 4), an ambient brightness level, an SNR level of the captured image, motion/location data output from block 66, gaze data output from tracking sensors 54, and/or other system constraints for adjusting the quality of the passthrough content depending on the current user context. For example, gaze data can be taken into account to check whether the user is actually looking at a candidate flicker region. If the user is not looking at a candidate flicker region (e.g., if the point of gaze is not aligned with a potential flicker source), then the adjustment of the exposure time can optionally be bypassed or skipped.

The new exposure time can be adjusted to be equal to a multiple of the detected flicker period (1/fy). For example, consider a scenario where the local light frequency fy is equal to 200 Hz, which corresponds to period of 5 ms. In such a scenario, the exposure period of one or more cameras 50 can be adjusted to 10 ms, 15 ms, 20 ms, or other multiple of 5 ms. A longer exposure time may be selected if the ambient lux level is low to help properly expose a darker scene. A shorter exposure time may be selected if the SNR is below a threshold level to help reduce noise. A shorter exposure time may be selected if the user is moving around to help minimize camera shake. Other considerations for adjusting the camera exposure time or frame rate can be considered during step 210.

The operations described in connection with FIGS. 4 and 5 are exemplary. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The methods and operations described above in connection with FIGS. 1-7 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device, comprising:

with a plurality of image sensors, acquiring images of a scene;

identifying a region of the images as a candidate region for including a light source;

determining whether the candidate region exhibits a pattern indicative of flicker; and reducing image artifacts resulting from flicker caused by the light source in the candidate region by adjusting an exposure time for the plurality of image sensors.

2. The method of claim 1, further comprising:

sensing one or more dominant flicker frequencies in the scene that are different from a frequency of the flicker of the light source.

3. The method of claim 1, further comprising:

with one or more depth sensors, obtaining depth information from the scene, wherein identifying the candidate region comprises identifying the candidate region based on the depth information.

4. The method of claim 3, wherein identifying the candidate region comprises identifying a planar surface in the scene based on the depth information.

5. The method of claim 3, wherein identifying the candidate region further comprises performing semantic segmentation to identify a region of the images with a display or a screen configured to emit the light source.

6. The method of claim 1, wherein identifying the candidate region comprises performing semantic segmentation to identify a region of the images with a display or a screen configured to emit the light source.

7. The method of claim 1, wherein the plurality of image sensors comprise roller shutter image sensors, and wherein determining whether the candidate region exhibits a pattern indicative of flicker comprises detecting horizontal bands in the images.

8. The method of claim 1, further comprising:

computing a frequency of the light source in the candidate region based on one or more of: the exposure time of the plurality of image sensors, a frame rate of the plurality of image sensors, and a line readout speed of the plurality of image sensors.

9. The method of claim 8, wherein adjusting the exposure time for the plurality of image sensors comprises setting the exposure time to a multiple of a flicker period that is equal to a reciprocal of the computed frequency of the light source in the candidate region.

10. The method of claim 1, further comprising:

with one or more tracking sensors, obtaining gaze data; and selectively bypassing the adjustment of the exposure time for reducing image artifacts resulting from flicker caused by the light source in the candidate region based on the gaze data.

11. A method of operating an electronic device, comprising:

during a first time period, acquiring a first plurality of images with external-facing cameras and identifying a first region in the first plurality of images as a first candidate region for producing local flicker;

during a second time period following the first time period, acquiring a second plurality of images with the external-facing cameras and identifying a second region in the second plurality of images as a second candidate region for producing local flicker;

confirming that the second candidate region corresponds to the first candidate region; and mitigating the local flicker in the first and second candidate regions by adjusting an exposure time of the external-facing cameras.

12. The method of claim 11, further comprising:

determining whether the first candidate region exhibits a pattern indicative of flicker; and determining whether the second candidate region exhibits a pattern indicative of flicker.

13. The method of claim 12, further comprising:

computing a first frequency of the local flicker in the first candidate region; and computing a second frequency of the local flicker in the second candidate region.

14. The method of claim 13, wherein confirming that the second candidate region corresponds to the first candidate regions comprises comparing the first computed frequency to the second computed frequency.

15. The method of claim 14, further comprising:

obtaining motion and location information on the electronic device, wherein confirming that the second candidate region corresponds to the first candidate region comprises:

identifying a first planar surface in the first candidate region;

identifying a second planar surface in the second candidate region; and comparing the first planar surface to the second planar surface based on the motion and location information.

16. The method of claim 13, further comprising:

sensing a dominant light source; and obtaining a frequency of the dominant light source, wherein the frequency of the dominant light source is different than the first computed frequency of the local flicker.

17. An electronic device comprising:

a plurality of external-facing cameras configured to acquire images of a scene;

one or more displays configured to output the acquired images; and control circuitry configured to:

identify an area of the acquired images as a candidate region for including a local light source;

determine whether the candidate region exhibits a pattern indicative of flicker; and mitigate flicker caused by the local light source on the one or more displays by adjusting an exposure time of the plurality of external-facing cameras.

18. The electronic device of claim 17, further comprising:

a flicker sensor configured to sense a dominant light source in the scene that is different than the local light source in the candidate region; and a flicker processor configured to obtain a frequency of the dominant light source.

19. The electronic device of claim 17, further comprising:

one or more depth sensors configured to obtain depth information from the scene, wherein the candidate region is identified based on the depth information.

20. The electronic device of claim 17, further comprising:

a scene understanding subsystem configured to perform semantic segmentation on the acquired images to generate corresponding labels, wherein the candidate region is identified based on the labels generated from the scene understanding subsystem.

21. The electronic device of claim 17, further comprising:

a motion and location determination subsystem configured to output motion and location information associated with the electronic device, wherein the control circuitry is further configured to confirm whether the candidate region exhibits flicker based on the motion and location information.

* * * * *